Nov. 10, 1942.   Q. McGILL HENDERSON   2,301,872
MEASURING APPARATUS
Filed May 30, 1942   3 Sheets-Sheet 1

INVENTOR
QUINTIN McGILL HENDERSON,
by: John E. Jackson
his Attorney.

Nov. 10, 1942.    Q. McGILL HENDERSON    2,301,872
MEASURING APPARATUS
Filed May 30, 1942    3 Sheets-Sheet 2

INVENTOR
QUINTIN McGILL HENDERSON,
by: John E. Jackson
his Attorney.

Nov. 10, 1942.                Q. McGILL HENDERSON                2,301,872
                                MEASURING APPARATUS
                              Filed May 30, 1942            3 Sheets-Sheet 3
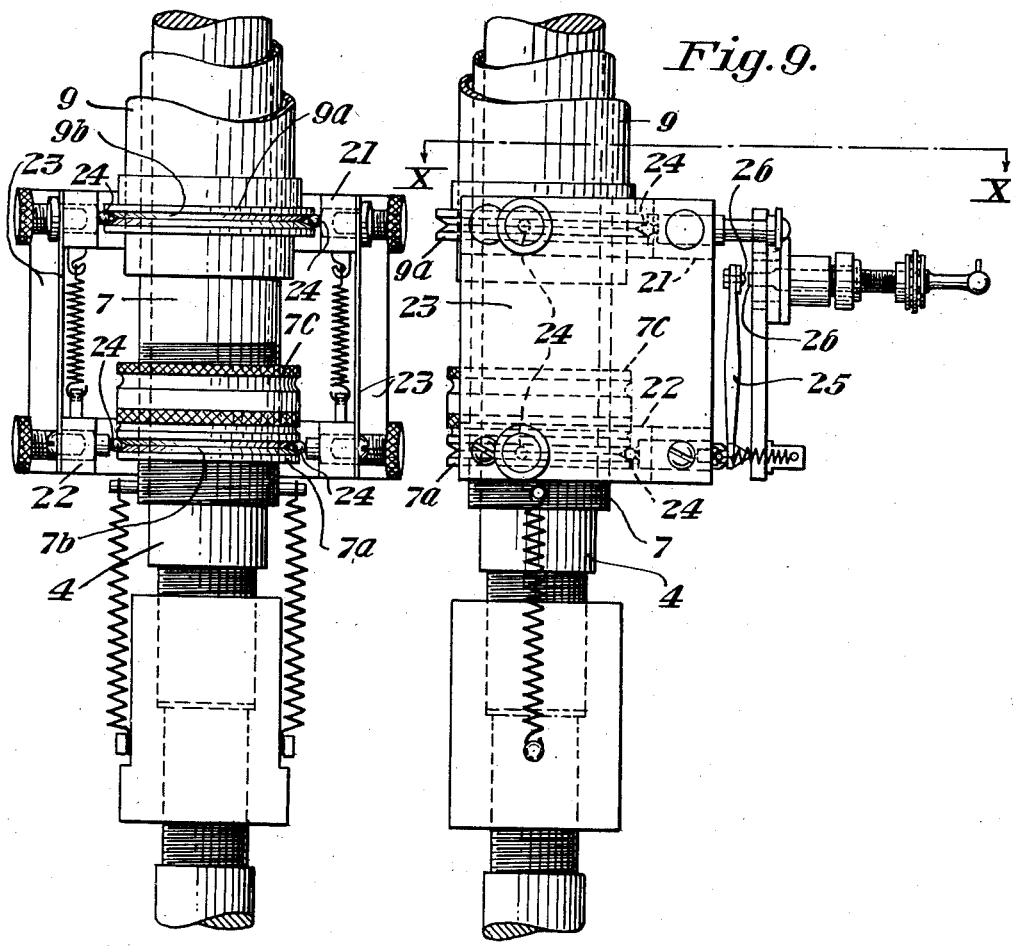
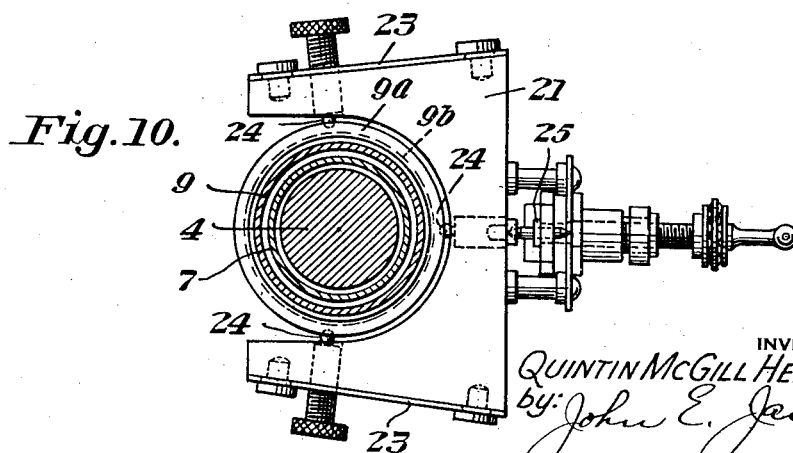
INVENTOR
QUINTIN McGILL HENDERSON,
by: John E. Jackson
    his Attorney.

Patented Nov. 10, 1942

2,301,872

UNITED STATES PATENT OFFICE 2,301,872

MEASURING APPARATUS

Quintin McGill Henderson, Kearny, N. J., assignor to United States Steel Corporation of Delaware, a corporation of Delaware Application May 30, 1942, Serial No. 445,167

4 Claims. (Cl. 33—147)

Broadly speaking, this invention comprises apparatus enabling the dimensional measuring of a part in an enclosure making direct measuring of the part inconvenient or impossible. It is especially applicable to a part which is to be measured at other than room temperature and where the temperature at time of measurement must be maintained within narrow limits. In its specific form, it comprises apparatus enabling extensional measuring of a tensile specimen in a furnace chamber having open ends through which pull rods project with their inside ends engaging the ends of the specimen and their outside ends accessible for loading by a tensile testing machine, this equipment being used in connection with the high-temperature tensile testing of metal such as steel.

This specific form is disclosed by the accompanying drawings, the various figures being as follows:

Fig. 8 is an enlargement from Fig. 1;

Fig. 9 is a side view of Fig. 8; and

Fig. 10 is a cross-section from the line X—X in Fig. 9.

Figure 1:
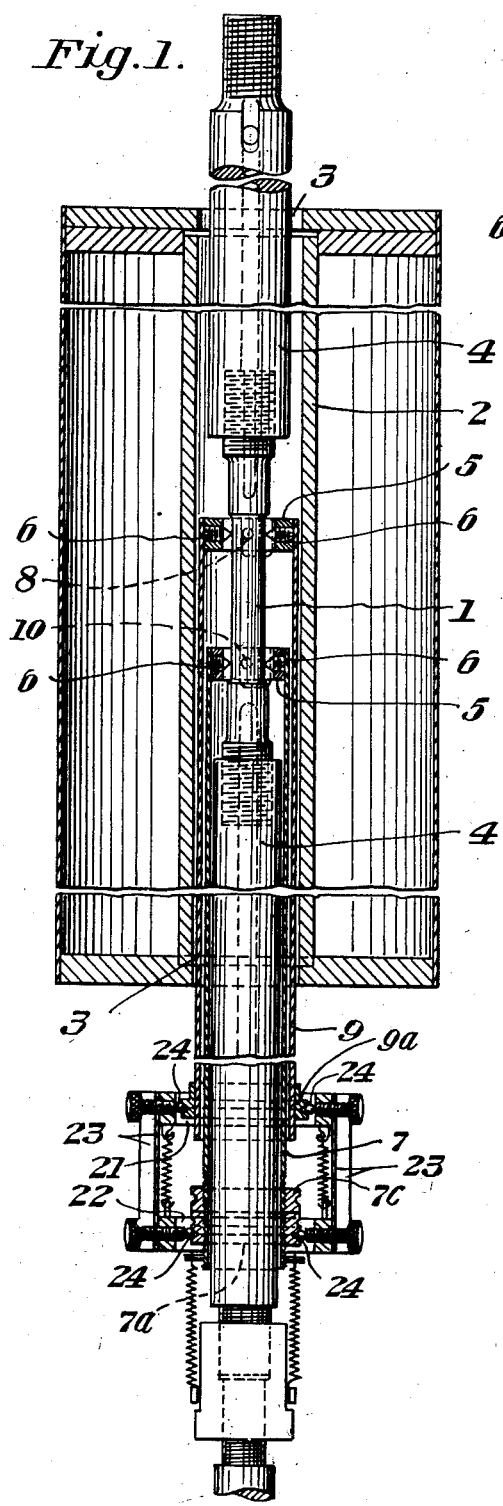
Fig. 1 is a vertical section of the described apparatus embodying the invention.
Figure 2:
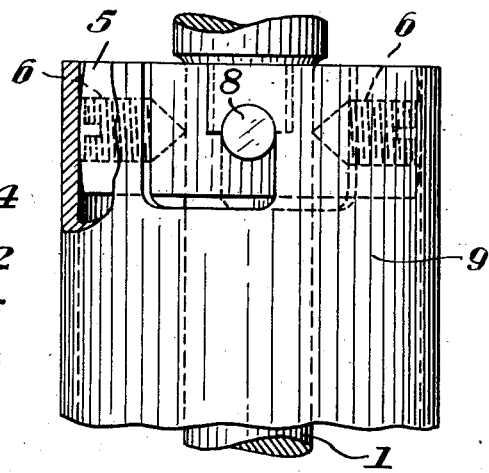
Fig. 2 is an enlargement from Fig. 1.
Figure 3:
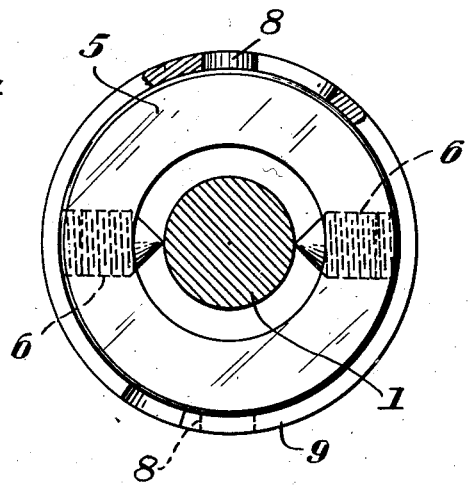
Fig. 3 is a top view of Fig. 2.
Figure 4:
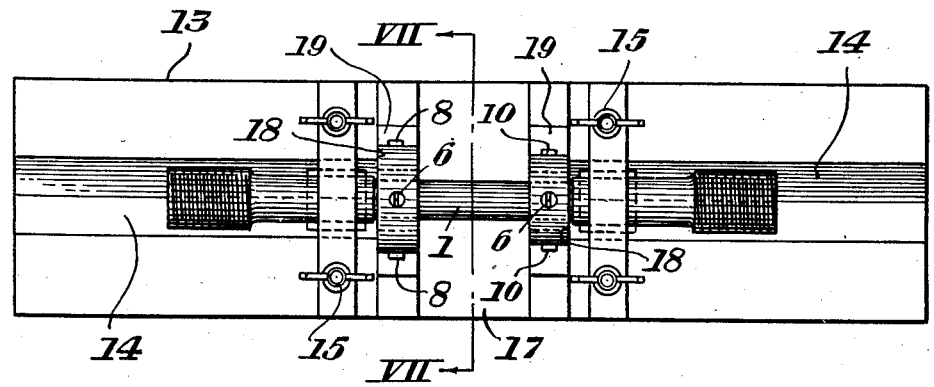
Fig. 4 is a top view of an assembling jig.
Figure 5:
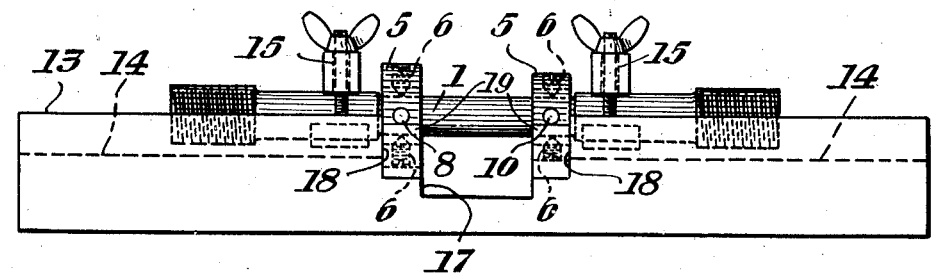
Fig. 5 is a side view of Fig. 4.
Figure 6:
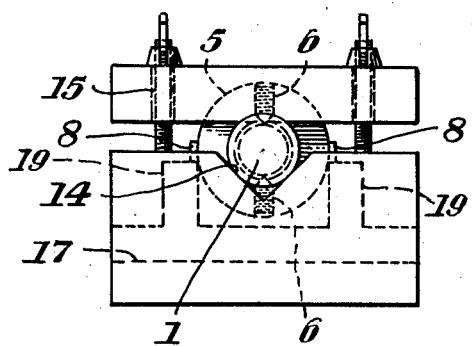
Fig. 6 is an end view of Fig. 4.
Figure 7:
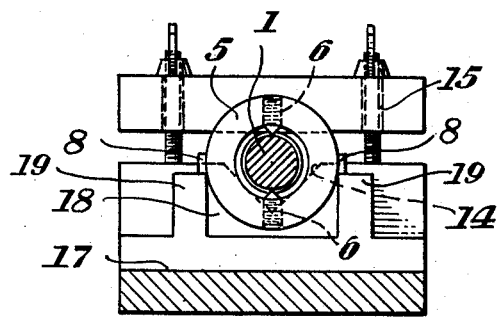
Fig. 7 is a cross-section from the line VII—VII in Fig. 4.

These drawings show the standard round tension test steel specimen 1 in the furnace chamber 2 having open ends 3 through which the straight pull rods 4 project with their inside ends in screw threaded engagement with the ends of the specimen 1 and their outside ends accessible for loading by a tensile testing machine. This arrangement is necessary for high-temperature tensile testing of the specimen 1, and makes it impossible to directly apply any conventional extensometer to the specimen 1 for the purpose of measuring its extension. Therefore, it is necessary to provide some means for accurately transmitting extensional changes in the specimen's dimensions to a position outside of the furnace chamber so that an extensometer can be used.

According to the present invention, two collars 5 are fixed to the specimen 1 by diametrically opposed pivot points 6 permitting rocking of these collars in one direction and engaging the specimen at spaced positions encompassing the specimen portion to be measured. A first tube 7 is passed over one of the rods 4 and projected through the adjacent open end of the chamber 2, with its inside end in bayonet joint connection with the adjacent one of the collars 5 and with the joint pins 8 at right angles to the pivot points 6 to provide a gimbal. That is to say, the collar can rock in one direction about its pivot points 6 engaging the specimen 1, and the tube can rock in the other direction about its bayonet joint formed with pins 8. A second tube 9 is passed over the same rod 4 and concentrically telescoped over the first tube 7, this tube 9 also being projected through the same open end of the chamber 2, and with its inside end in bayonet joint connection with the other or remote one of the collars 5, the joint pins 10 likewise being at right angles to the pivot points 6 of this collar to provide a gimbal as previously described. The one of the collars 5 jointed to the first tube 7 must be of smaller diameter than the other jointed to the other and necessarily larger diametered tube 9.

Both the tubes 7 and 9 are concentric and symmetrical respecting each other, whereby they are affected alike by thermal expansion. The tubes are relatively movable and, therefore, relatively move with dimensional changes in the gage length of the specimen, so that their outside accessible ends receive the same motion, this permitting the application of an extensometer to these outside ends. The outside end of the tube 7 projects beyond that of the tube 9 so the extensometer can be conveniently applied to these ends. To make this more convenient the outer ends of the tubes 7 and 9 are provided respectively with rings 7a and 9a, the ring 9a being immovably fixed to the tube 9, and the ring 7a being in screw threaded engagement with the tube 7 so that it can be adjusted longitudinally of the tube, a threaded locking ring 7c serving to lock the ring 7a against inadvertent movement. Both rings are provided with circumferential V-shaped grooves 7b and 9b to permit application of an extensometer, the ring 7a being made adjustable as described to compensate for variations in the gage length of the specimen due to its temperature, so that the calibrated gage length actually measured by the extensometer, may be brought to standard. Since the tubes are connected to the collars by gimbals and the collars are fastened to the specimen by diametrically opposed pivot points set at right angles to the signals, it follows that the tubes are free to align themselves with respect to the major axis of the specimen. As the pivot points pass through this major axis, the relative movement of the tubes represents the average extension of the specimen. Since both tubes are brought to test temperature with the specimen, a constant temperature gradient will exist over the entire length of both tubes. Therefore differences in testing temperatures will not cause the apparatus to function erratically. The tubes are maintained concentric respecting each other, as well as the specimen 1 and the one of the pull rods 4 over which the tubes pass, by the rings 5 at their inside ends, and by centering rings 11 and 12 at their outside ends.

The extensometer used with the apparatus described comprises top and bottom yokes 21, 22, inter-associated for free relative movement, by side plates 23, each provided with 3 ball-pointed pins 24 that can be screwed into the grooves of the previously described rings so as to mount the yokes parallel each other and symmetrically about the centers of the tubes 7 and 9, the only direction the yokes can move being the same as that of the tubes. When the yokes separate due to extension of the specimen, a lever 25 is rocked so as to break electric contacts 26 which control electrical means including a motor which screws one of the contacts 26 toward the other until contact is reestablished, the distance which the movable contact must be moved being a measure of the extension of the specimen. The extensometer is shown partially schematically, and only its essential operating elements are described, since it is advanced only to show the manner of its application to the apparatus disclosed herein.

It is necessary for the pivot pins 6 of the two collars 5 to accurately engage the extremes of the gage length of the specimen, and that the collars be positioned concentrically about the specimen. This is assured by mounting the rings to the specimen prior to the latter being positioned in the furnace chamber, a jig 13 being used for this purpose. This jig has a V-shaped trough 14 in which the ends of the specimen are fixed by screw clamps 15, this trough having recesses 16 providing clearance for the threaded ends of the specimen, and a centrally positioned recess 17 providing clearance for the two collars. This recess 17 terminates with abutments 18 spaced so that when the outer faces of the collars rest thereagainst, their pivot points will be directly in line with the gage length extremes of the specimen. Furthermore, the collars rest against abutments 19, which space the collars concentric with the specimen. These pivot points comprise screws oppositely threaded into the collars and which may be screwed inwardly to bring their pointed ends into engagement with the gage length extremes of the specimen. In this manner the collars may be conveniently and accurately applied to the specimen.

I claim:

1. Apparatus enabling dimensional measuring of a part in an enclosure, comprising longitudinally movable telescoped tubes projecting through an opening in said enclosure with their inside ends provided with means for individually engaging them with said part at spaced positions encompassing the portion to be measured, and with their outside ends accessible for measuring their relative longitudinal positions.

2. Apparatus enabling dimensional measuring of a specimen in an enclosure having an opening through which a straight load transmitting rod projects with its inside end engaging said specimen and its outside end accessible for loading, said apparatus comprising longitudinally movable concentrically telescoped tubes projecting through said opening around said rod with their inside ends provided with gimbals for individually engaging them with said specimen at spaced positions encompassing the portion to be measured, and with their outside ends accessible for measuring their relative longitudinal positions.

3. Apparatus enabling extensional measuring of a tensile specimen in a furnace chamber having open ends through which pull rods project with their inside ends engaging the ends of said specimen and their outside ends accessible for loading by a tensile testing machine, said apparatus comprising gimbals encircling and engaging said specimen at spaced positions encompassing the portion to be measured, a first tube passed over one of said rods and projected through the adjacent open end of said chamber with its inside end engaging said specimen through the adjacent one of said gimbals, and a second tube passed over said rod and concentrically telescoped over said first tube and projected through said open end of said chamber with its inside end engaging said specimen through the remote one of said gimbals, said tubes being relatively movable longitudinally and the outside end of said first tube projecting beyond that of said second tube with both said outside ends accessible to permit the application of an extensometer thereto.

4. Apparatus enabling extensional measuring of a tensile specimen in a furnace chamber having open ends through which pull rods project with their inside ends engaging the ends of said specimen and their outside ends accessible for loading by a tensile testing machine, said apparatus comprising two collars fixed to said specimen by opposed pivot points permitting rocking of said collars in one direction and at spaced positions encompassing the specimen portion to be measured, a first tube passed over one of said rods and projected through the adjacent open end of said chamber with its inside end in bayonet joint connection with the adjacent one of said collars with the joint pins at right angles to said pivot points thereof to provide a gimbal, and a second tube passed over said rod and concentrically telescoped over said first tube and projected through said open end of said chamber with its inside end in bayonet joint connection with the remote one of said collars with the joint pin at right angles to said pivot points thereof to provide a gimbal, said tubes being relatively movable longitudinally and the outside end of said first tube projecting beyond that of said second tube with both said outside ends accessible to permit the application of an extensometer thereto.

QUINTIN McGILL HENDERSON.